May 23, 1967  R. L. BUSTAMANTE  3,321,621
ILLUMINATING MEANS FOR A VEHICLE
Original Filed July 12, 1963  2 Sheets-Sheet 2
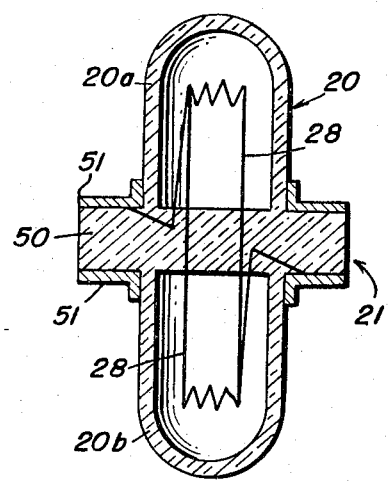
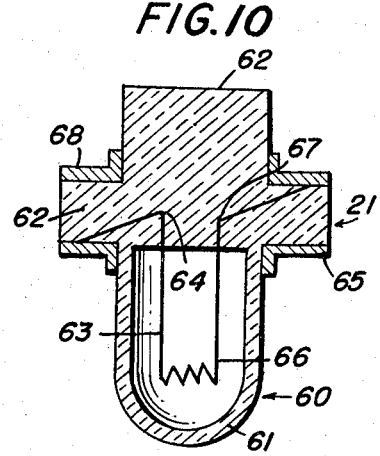
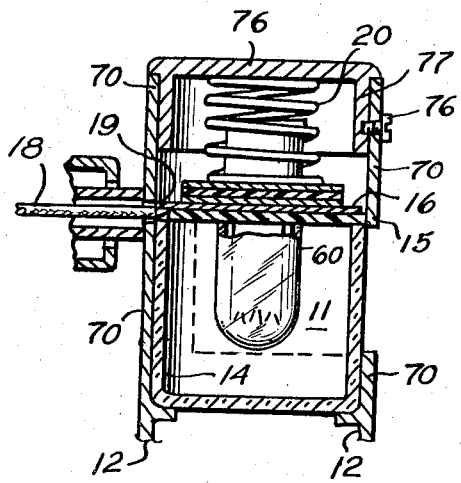
INVENTOR
ROBERTO L. BUSTAMANTE
By Cushman Darby & Cushman
ATTORNEYS

United States Patent Office 3,321,621
Patented May 23, 1967

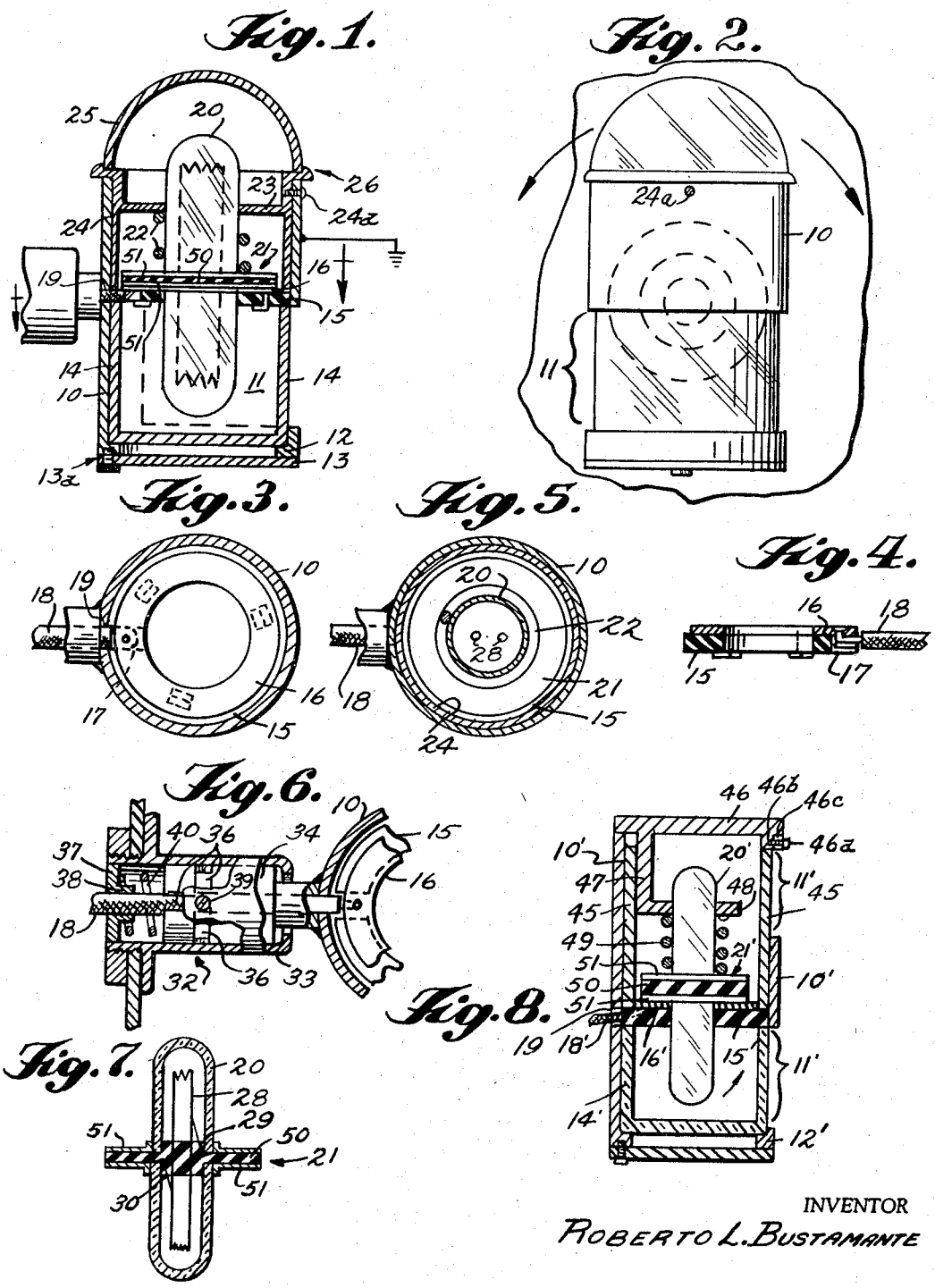

3,321,621
ILLUMINATING MEANS FOR A VEHICLE
Roberto L. Bustamante, Santa Ana, El Salvador
Original application July 12, 1963, Ser. No. 294,701, now Patent No. 3,278,787, dated Oct. 11, 1966. Divided and this application Jan. 12, 1966, Ser. No. 535,631
4 Claims. (Cl. 240—57)

This application is a division of my copending application Ser. No. 294,701 filed July 12, 1963, now Patent No. 3,278,787, dated Oct. 11, 1966, which, in turn, is a continuation-in-part of my application Ser. No. 524,129, filed July 25, 1955, and now Patent No. 3,114,509, dated Dec. 17, 1963.

The present invention relates to an illuminating means. More particularly, the present invention relates to a bulb and lamp assembly for use as a signal light on motor vehicles for the purpose of indicating the dimensions of such vehicles to other vehicles and pedestrians during unfavorable traffic conditions.

It is well known that during periods of darkness, fog, wet weather, and other unfavorable traffic conditions, vehicle headlights frequently temporarily blind drivers and passengers of vehicles approaching one another from opposite directions with the result that the oncoming vehicles may suffer temporary loss of direction and may consequently run off the road, strike another vehicle or a pedestrian or, as is very often the case, strike the first vehicle at a point rearward of its headlights. These "blinding" incidents commonly occur principally due to the brightness of vehicular headlights when contrasted with surrounding darkened areas, but also due to the fact that the "blinding" headlights are located generally towards the frontmost portions of vehicles such that it is practically impossible for the "blinded" person to determine the dimensions of his vehicular "assailant." This situation is particularly true of vehicles such as vans, trucks and trailers, and, while such vehicles have been provided with safety lights, these lights are either not disposed at the points of greatest width of the vehicle or are positioned at locations which are difficult to see.

In the case of pedestrians, cyclists, and the like, the same problems arise, and many persons are injured while walking or riding along unlighted highways or roads since they have no way of visually discerning the actual external dimensions of the oncoming vehicle due to the blinding effects of the headlights. These blinding effects have also surprisingly been observed on paved and lighted streets and highways, and particularly during damp and wet weather.

It is therefore an important object of this invention to provide a warning light and lamp assembly which will overcome the disadvantages and objectionable features of prior art devices.

Other objects and advantages of this invention will become more apparent to those skilled in the art when reference is had to the accompanying description and drawing.

The objects of this invention are accomplished by locating a signal or warning lamp of novel construction on at least one side of a vehicle in an area greatest approximate dimensions which lie in the normal line of vision of pedestrians and drivers of oncoming vehicles. The invention also envisions a lamp and bulb assembly of novel construction that will emit light rays that are visible throughout an arc of more than 180° degrees and up to at least 270 degrees, whereby the lamp can be seen from great distances forwardly, rearwardly and laternally of the vehicle.

More particularly, the objects of this invention are accomplished by providing a clearance light for motor vehicle and other uses, comprising a housing having at least two vertically spaced windows therein, the housing having upper and lower open ends, means serving to close the upper open end, seat means at the open lower end, a horizontally disposed insulated metal contact ring supported within the housing, the seat means serving to support the contact ring and including a transparent insulated cup having an outer diameter slightly less than the inner diameter of the housing with the insulated metal contact ring resting on the upper edge of the cup, a transparent sleeve within the housing above the contact ring and terminating short of the upper open end of the housing, the cup and the sleeve also serving to seal the inside of the housing against the entry of foreign matter, a conductor connected to the said ring and passing through an opening in the side of the housing for connection to a source of electrical energy, a bulb disposed within the housing above the ring and visible through one of said windows, a metal annulus on the bulb for direct engagement with a major part of the contact ring, spring means within the housing urging said ring and annulus together, and means for mounting the housing on the motor vehicle.

The actual housing of the present signal lamp assembly is provided with at least one and preferably with a plurality of visible light openings that may be of different color in order to aid ocular focusing frontwardly, rearwardly and laterally of a vehicle by pedestrians and cyclists, and by drivers and passengers of oncoming vehicles. The signal lamp assembly is electrically connected to the vehicle and may be attached thereto directly above the rear axle in the normal line of vision of oncoming traffic.

The signal lamp housing is preferably provided with a novel bracket assembly for adjustably enabling light rays projected therefrom to the directed downwardly, forwardly and/or rearwardly so that the present signal lamp may not only be employed for warning purposes, but may additionally be employed for emergency and utility functions. With such adjustable features, the present lamp assembly may also be employed as a guiding light, a parking light, an identification light, a trouble light for emergency vehicle repairs, and may even be focused in a downward direction to illuminate the roadway and areas adjacent the vehicle as a courtesy light and the like for persons leaving vehicles.

Illumination according to the present invention is provided by a novel light bulb assembly arranged within the housing for directing light rays through the openings. This light bulb assembly is provided with an annular element adapted to rest upon an annular contact ring which is mounted within the housing. Electric current is provided to the annulus element and annular contact ring by means of an electrical conductor passing through the housing and connected to the contact ring. Electrical connection to ground is provided by a spring or the like means associated with the housing and the annular element to urge the annular element into contact with the annular contact ring.

Further understanding of the objects and advantages of the present invention will be had with reference to the accompanying drawings. In the drawings, identical reference characters have been employed to denote the same or similar parts throughout the several views, and thereby indicate the advantageous interchangeability of parts that is realized by the several modifications of the present invention.

Referring to the drawings:

FIGURE 1 is a vertical side view, partially in section, showing the basic lamp structure according to the present invention;

FIGURE 2 is a front view, not in section, of the lamp structure shown in FIGURE 1;

FIGURE 3 is a plan view of the annular contact ring assembly employed in the lamp of FIGURE 1;

FIGURE 4 is a vertical section through the annular contact ring shown in FIGURE 3;

FIGURE 5 is an upper horizontal section through the lamp structure of FIGURE 1 and showing the relationship of the spring and annular element with the bulb and annular contact ring;

FIGURE 6 is a horizontal detail view, partly in section, of the adjustable supporting bracket according to this invention, taken through the bracket structure shown in the left-hand portion of FIGURE 1;

FIGURE 7 is a vertical sectional view of a modification of the bulb assembly shown in FIGURE 1;

FIGURE 8 is a vertical sectional view of another embodiment of the lamp structure of this invention;

FIGURE 9 is a detail cross-sectional view of the bulb assembly shown in FIGURE 1;

FIGURE 10 is a vertical sectional view of still another modification of the bulb assembly shown in FIGURE 1; and FIGURE 11 is another modification of the lamp assembly shown in FIGURE 1 and using the bulb modification of FIGURE 10.

Turning now to FIGURE 1, it can be seen that the present lamp comprises a housing 10 provided with a horizontally disposed glass or plastic window 11 which is essentially transparent and extends through an arc of at least 270 degrees to provide illumination throughout substantially the entire circumference of the housing. The housing may be constructed from any suitable metal, plastic or composition material and may be opaque, translucent or transparent. The housing is preferably open at each end thereof and the lower end may be provided with an inwardly disposed ring 12 on which is pivoted a cover plate 13 attached by means of a screw as at 13a. A glass or plastic transparent cup 14, the outer diameter of which substantially coincides with the inner diameter of the housing, is disposed within the housing and the lower closed end thereof rests upon the ring 12.

As shown more clearly in FIGURES 3 and 4, an insulating washer 15 composed of plastic, a fiber composition, or other insulating material is positioned within housing 10 and is supported by the upper open end of the cup 14. Annular contact ring 16 is formed of metal and has prongs which engage slots in the washer to anchor the contact ring to the washer, and the washer is formed with a radial slot 17 (see FIGURE 4) in which a single wire conductor 18 is located, the conductor being suitably connected to ring 16 as by metal clips integral with ring 16. From ring 16, conductor 18 extends through an aperture 19 in the wall of the housing 10. Hence, it will be seen that conductor 18 is located within the height dimension of slot 17 so that contact ring 16 can rest flush on the upper planar surface of insulating washer 15 and the lower surface of the washer can rest flat on the upper end of cup 14.

Returning to FIGURE 1, light bulb assembly 20 is provided with a horizontal flange or annulus element 21, which when inserted into housing 10 rests upon contact ring 16 to provide an electrical contact between the conductor 18, contact ring 16 and lower surface 51 of annulus 21 (see FIGURES 7 and 9). To maintain annulus 21 in engagement with contact ring 16, a coil spring 22 surrounds bulb 20 and the upper end thereof bears against the under surface of flange 23 on metal cup 24 which is inserted into housing 10 with a lower open end of the cup resting on the upper face of washer 15. The lower end of spring 22 bears against the upper face 51, of annulus 21 as shown in FIGURES 1 and 5. Consequently, when the cup 24 is in place, spring 22 will urge annulus 21 into engagement with contact ring 15, thereby providing electrical contact from the upper surface 51 of annulus 21 to ground through the metal construction material of flange 23, cup 24, housing 10 and the adjustable bracket described hereinafter.

The lower end of cup 24 and insulating washer 15 also co-act to provide an electrical and weather resistant seal between the respective parts.

A glass or transparent plastic dome 25 closes the upper end of housing 10 and is held in place at its lower end by engagement with the upper surface of flange 23 on cup 24, both dome 25 and flange 23 coacting with a generally L-shaped cross section flange attached to cup 24 as indicated at 26. To secure the cup 24 in place, the wall of the cup and the wall housing 10 are provided with registering apertures and a screw 24a is lodged in such apertures.

The light bulb assembly 20, shown in FIGURES 7, 9 and 10, and described in detail hereinafter, is preferably of a miniature size and may be of either single (FIGURE 10) or double bulb character according to the invention. In situations where the double bulb construction of this invention is employed, the lower portion of the bulb will be located within the window opening 11 whereas the upper portion of the bulb will be seen from within dome 25.

Either the upper portion of bulb 20 or dome 25 may be colored differently than the lower portion of the bulb or lower window 11. For example, a colored or pigmented and transparent, or translucent window 11 can also be provided to accomplish coloring of the lower portion of the bulb.

With further reference to the cover plate 13, if such plate is swung about its pivot 13a away from the housing, the lower end of housing 10 is uncovered, and rays of the bulb will be directed in a downward direction to illuminate a limited area of the vehicle and the roadway. The cover plate, instead of swinging about a vertical pin, could also be pivoted about a spring loaded horizontal pin or the equivalent. Further still, a lower cap having spring fingers in the vertical wall thereof, or a dome similar to dome 25 may be used in place of cover plate 13.

The primary constructional feature of the present invention, as shown by the several modifications, is that the present lamp in its entirety consumes but little space and thus can be installed on vehicles without detracting from the contour and aesthetic design of the vehicle. Furthermore, in the event it is necessary to replace the bulb, this can be done by merely removing the upper closure. In addition, flange 23 of metal cup 24 serves as a guide for the bulb, making it easy to install the same.

With the parts assembled as described above, housing 10 may be attached to the side of a vehicle above the rear axle or other suitable wide portion in the line of vision of oncoming traffic and pedestrians, etc. The attachment means may comprise a stationary bracket or a bracket permitting the housing and its parts to be swung through an arc of 90 degrees in either direction from the vertical to provide perpendicular positioning with respect to the road being traversed.

In the case of a stationary bracket, the bracket may economically be formed with the material left over from the fabrication of the window, which material may be bent back and outwardly to define two diametrically opposed wings which can be disposed in contact with the side of the vehicle, and a screw, bolt, or other attaching device can be passed through an opening in each wing to secure the housing to the vehicle side.

It is a preferred feature of this invention however that housing 10 be rotatable through an arc of 180 degrees, that is, 90 degrees from the vertical in either a clockwise or a counter-clockwise direction, noted by the arrows in FIGURE 2, and to achieve this end, a special mounting bracket 32 (see FIGURE 6) is used. This bracket includes an elongated casing 33 which at one end is secured to the side wall of the vehicle in any convenient manner such as by the co-action of screw threads with a suitable bolt. Casing 33 is hollow and surrounds a sleeve 34 disposed therein. The sleeve has a reduced diameter extension which passes through an opening in the righthand end of casing 33 and this extension is brazed, welded or otherwise connected to lamp housing 10 to serve as an axle connecting lamp housing 10 with sleeve 34 and casing 33 of the bracket assembly.

A fitting 37 closes the inner open end of casing 33 by means of cooperating screw threads on the exterior portion of fitting 37 and interior of casing 33. Fitting 37 is provided with a central bore and an annular extension 38 to accommodate electric wire 18. A coil spring 40 surrounds annular extension 38 with one end bearing against the lower face of fitting 37 and the other end against a shoulder of sleeve 34.

Sleeve 34 is provided with a T-shaped bayonet slot 36 which extends 90 degrees in either direction from the central portion or leg of the "T." Bracket casing 33 is also provided with an interior lug or small screw 39 which is adapted to cooperate with bayonet slot 36. To rotate housing 10 either 90 degrees to the left or to the right, housing 10 is pushed inwardly and towards the vehicle or other supporting structure, thus compressing spring 40 such that lug 39 leaves the leg of the T and enters the lateral portions of T-shaped bayonet slot 36 whereupon sleeve 34 and housing 10 attached thereto may be turned in the direction desired and when released, the spring will hold the sleeve in the proper position in the selected lateral portion of the bayonet slot.

As noted above, conductor 18 passes through the bore of fitting 37 and extension 38, and then through casing 33 and sleeve 34, without interfering with the turning action. Annular extension 38 of fitting 37 serves as a guide for conductor 18 and spring 40 and keeps the conductor out of contact with the spring. Finally, right hand extension of sleeve 34 serves to guide conductor 18 into opening 19 in housing 10. By thus mounting housing 10, it will be appreciated that light rays may be directed toward the front or the rear of a vehicle to function as a trouble lamp for changing flat tires or making any other desired repairs within the effective range of the lamp or lamps.

It is an important feature of the present invention when using a double ended bulb, that the two ends thereof may be of different colors or of the same color if cup 14 and dome 25 are of different colors. Preferably, the color of the lower light portion of the bulb assembly, or cup 14, is of a type that will emanate pale colored or white light to provide adequate lighting for the purposes hereinabove mentioned, while the upper light portion of the bulb, or dome 25, may be green, red, amber or a color matching the color of the vehicle upon which the present warning light is mounted.

This arrangement will serve to aid the ocular focusing of oncoming drivers or pedestrians thereon, and, upon education or by traffic regulations, the public will begin to associate two small lights of different colors with that area of the vehicle possessing largest dimensions and thus be able to gauge the clearance necessary to pass the oncoming vehicle and avoid collisions therewith. In addition to this function, the light may also serve as a parking light, a trouble light and a means of identifying the particular vehicle to which it is attached. Furthermore, the lower bulb will illuminate a substantial area on both sides of the light. One of the most important features of the invention is the fact that window 11 is of such dimensions that light rays are visible throughout an arc of substantially 270 degrees so that the lights are visible from any point forward, rearward or lateral of the vehicle. Since the respective portions of the bulb are separated, separate colors are visible in the window 11 and dome 25 to give the effect of two distinct lights and this effect is readily discernible by the oncoming traffic, either vehicular or pedestrian.

In an alternative embodiment shown in FIGURE 8, housing 10' is provided with two vertically spaced windows 11' and glass cup 14' rests on ring 12'. Insulating washer 15' and annular contact ring 16' are disposed upon the upper open end of cup 14' and annulus 21' of bulb 20' rests upon ring 16'. A glass sleeve 45 closes upper window 11' with the lower end bearing on the upper surface of washer 15' and the upper end terminating short of the upper end of the housing 10'. To maintain annulus 21' in contact with ring 16', a closure cap 46 is provided with a vertical strip 47 having a horizontally disposed ring 48 at the lower end thereof and one end of spring 49 may be secured to the ring 48. The cap 46 may be secured to the housing 10' by lodging a screw 46a in registering apertures 46b and 46c in the wall of the cap and the upper ring of the housing 10'. The other end of spring 49 bears against annulus 21' and with cap 46 in place, the spring will urge the annulus into contact with the annular contact ring.

With further reference to annulus element 21', it will be seen the same includes a central insulating or pressure footing portion 50 of glass or other insulating material and outer metal annulus contact plates 51 to which the wires of the filaments are secured, the wires passing through the central part 50 as shown more clearly in FIGURES 7 and 9.

Referring now to FIGURES 7 and 9, light bulb assemblies suitable for use in the modification of FIGURES 1 and 8 are shown in cross-section detail and comprise upper and lower glass envelope portions 20a and 20b, and electrode lead wires 28. Lead wires 28 pass through and are supported by means of embedment in a pressure footing, glass bead, glass pearl, or other centrally disposed insulating material 50 and are connected at their upper end by means of small filaments. Secondary electrode wires are provided to connect each electrode lead wire 28 with the exterior upper and lower metal annulus plates 51 for electrical connection with insulated conductor 18, or with ground through spring 22 (or 49 in FIGURE 8). As with the modification shown in FIGURES 7 and 9, the secondary electrode connection from right hand lead wire 28 is bent as at 29 and is attached to upper annulus 51 on the upper surface of annulus 21 (or 21') which is in contact with spring 22 and ground through housing 10 and bracket 32. The secondary electrode connection to left hand electrode lead 28 is similarly bent as at 30 and connected to the corresponding lower annular plate 51 which in turn is in electrical connection with contact ring 16 and conductor wire 18. As shown in FIGURE 7, annulus 21 may be of greater width within the glass envelope of bulb 20, than on the outside thereof for strengthening purposes.

Turning now to FIGURE 10, there is shown another modification which employs a single inverted bulb assembly indicated generally at 60 and provided with glass envelope 61 and a large pressure footing 62 which also acts as a support for the bulb. In this instance, lead wire 63 is bent at 64 and connected to lower metal annulus 65, and lead wire 66 is bent slightly at 67 and connected to upper metal annulus 68. As will be described in detail with regard to FIGURE 11, the lower annulus is in contact with contact ring 16 and electrical conductor 18 and upper annulus is in contact with a spring 20 leading to ground.

It will be appreciated at this time that the several light bulb modifications shown in the present invention offer advantages in simplicity, ease of manufacture, quick replacement and the elimination of screw threads, projecting lugs and similar means presently employed to secure bulbs in sockets. In so doing, the present invention permits light bulb constructions wherein a greater portion of the dimensions can be devoted to the glass envelope and filament assembly, resulting in the production of miniature bulbs with a materially greater amount of illumination per unit of overall dimensions, and this feature is heightened with the use of the present double bulb assembly.

It is also to be understood, moreover, that the dimensions shown for the several parts of the present invention, for the purposes of clarity, are not drawn to scale. Thus, the several parts, such as annulus 21 of the bulbs and annulus plates 51 may be of minimal thickness to insure the miniature size of the assembly.

Turning to FIGURE 11, the housing of FIGURE 1 is shown slightly modified as housing 70 which is adapted to be used with the single bulb assembly of FIGURE 10. Bulb 60 is therefore disposed downwardly and the annulus thereof rests on contact ring 16 which in turn rests upon insulating washer 15. As in FIGURES 1 and 8, washer 15 is of enlarged size, such that it just fits within housing 70, and as shown, the insulating washer is supported on glass cup 14 and the lower closed end of cup 14 rests upon ring 12. Contact with ground, and the retention of bulb assembly 60 within housing 70 is assured by spring 20 bearing against cover portion 76. Spring 20 is in turn secured in place by close fitting contact with enlarged pressure footing portion 62. Cover portion 76, in its turn, is locked against separation from housing 70 by means of screw 76a registering with suitable apertures in housing 70 and depending annular portion 77 of cover portion 76.

In reviewing the several modifications of this invention, it will be appreciated that many obvious modifications may be made without departing from the spirit of this invention. For example, various types of closures can be used with the open ends of housings 10 and 70 and the window or windows 11 can be of various types. Typically, the window may be of continuous type, or it may be formed by a series of spaced apart openings of any desired configuration. Regardless of what type window is employed, light will be visible throughout an arc of usually not less than 270 degrees.

It is therefore to be understood by those skilled in the art that this invention should only be limited to the extent shown by the following claims.

What is claimed is:

1. An adjustable bracket assembly for adjustable attachment of a clearance light housing to a vehicle and for receiving and permitting the passage therethrough of an electrical conductor from a source of electrical energy in said vehicle to a light source in said clearance light, comprising an elongated casing, said casing being open at both ends and one of said ends being adapted for mounting attachment to said vehicle, a movable sleeve disposed within said casing, said sleeve being provided with an elongated extension, said elongated extension being of a lesser diameter than said sleeve and extending through the other end of said casing opposite said end adapted for connection to said vehicle, the opening in said other end of said casing being restricted so that said sleeve will be prevented from passing through said casing, said elongated extension supportably connecting said housing with said sleeve and casing and vehicle and thereby permitting movement of said housing with respect to said casing and said vehicle, said sleeve being provided with a T-shaped bayonet slot adapted to receive a lug carried by and projecting from an interior portion of said casing such that said housing will be removably secured in a first position when said lug is received by the leg portion of said T-shaped bayonet slot and turnable in opposed directions transversely from said first position when said lug is received by the top portion of said T-shaped bayonet slot.

2. The adjustable bracket assembly of claim 1 wherein the end of said casing adapted for mounting attachment to said vehicle is provided with external screw threads such that said casing end may be inserted through an opening in said vehicle and said external screw threads may receive a nut with corresponding screw threads for secure removable attachment to said vehicle.

3. The adjustable bracket assembly of claim 1 wherein the end of said casing adapted for mounting attachment to said vehicle is provided with interior screw threads to receive an interior fitting with matching screw threads, said interior fitting having a central elongated portion, said fitting and said central elongated portion being provided with an opening for receiving and permitting passage therethrough of said electrical conductor.

4. The adjustable bracket assembly of claim 3 including resilient spring means associated with said fitting and adapted to resist movement of said sleeve toward said fitting.

References Cited by the Examiner

UNITED STATES PATENTS

| | | | |
|---|---|---|---|
| 1,082,079 | 12/1913 | Goff | 240—57 X |
| 1,632,127 | 6/1927 | Goodstein | 240—8.2 X |
| 1,987,117 | 1/1935 | Levesque | 240—57 X |
| 2,069,239 | 2/1937 | Fraser | 240—8.2 X |
| 2,424,688 | 7/1947 | Grimes | 240—57 X |
| 2,644,380 | 7/1953 | Mendelsohn | 248—205 X |
| 2,744,998 | 5/1956 | Halvorson | 240—57 X |

NORTON ANSHER, *Primary Examiner.*

J. F. PETERS, *Assistant Examiner.*